INVENTOR.
THOMAS EDMUND NOAKES
BY
SMITH, WILSON, LEWIS & McRAE

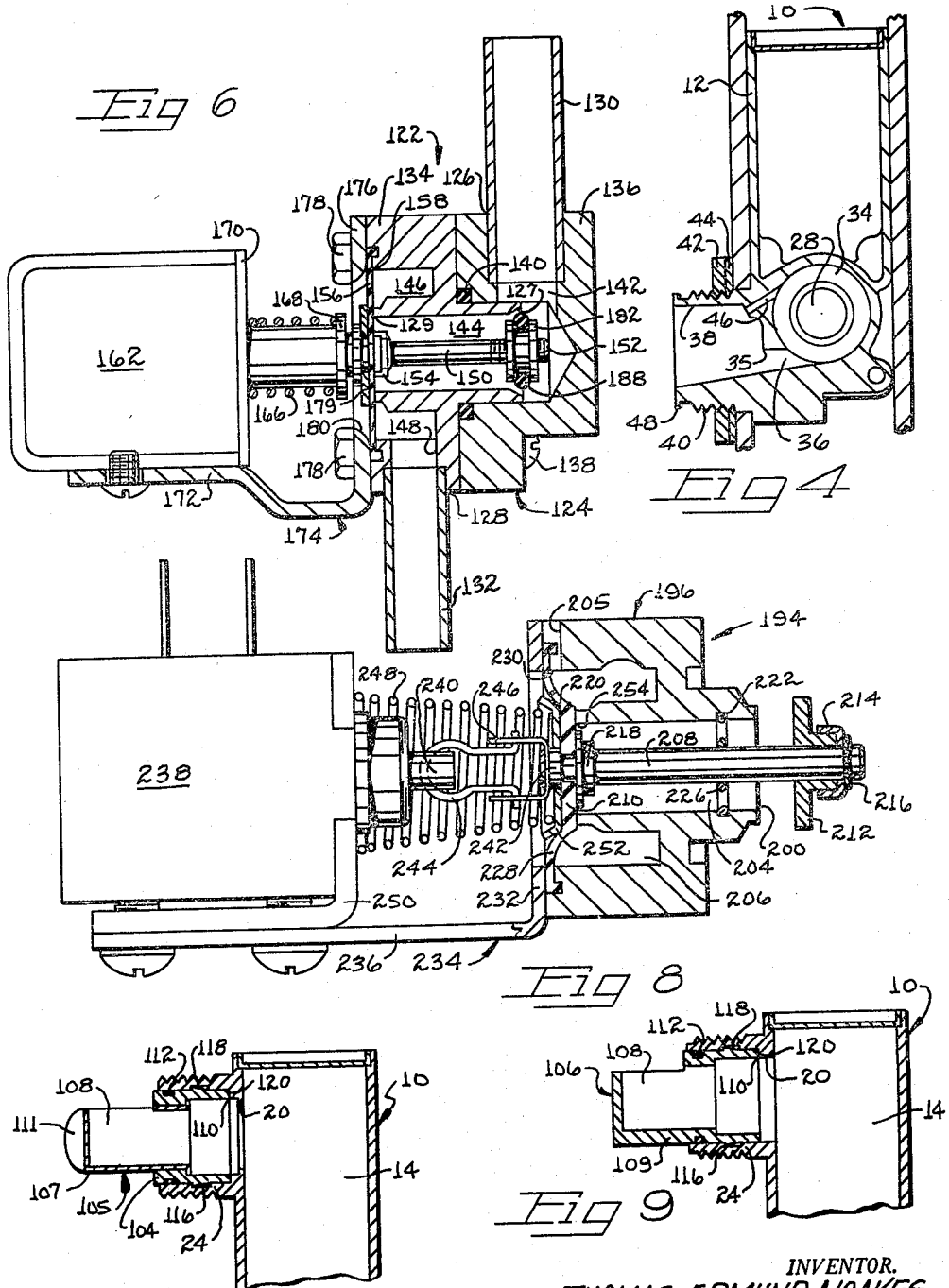

Nov. 8, 1960 T. E. NOAKES 2,959,341
LIQUID DISPENSER
Filed Jan. 7, 1959 3 Sheets-Sheet 3

INVENTOR.
THOMAS EDMUND NOAKES
BY
SMITH, WILSON, LEWIS & McRAE

United States Patent Office 2,959,341
Patented Nov. 8, 1960

2,959,341

LIQUID DISPENSER

Thomas Edmund Noakes, Detroit, Mich., assignor to American Radiator & Standard Sanitary Corporation, New York, N.Y., a corporation of Delaware Filed Jan. 7, 1959, Ser. No. 785,478

13 Claims. (Cl. 222—181)

The present invention relates to a liquid dispensing device. More particularly, this invention relates to a device for storing and metering a liquid additive into home appliances, such for example, as clothes or dishwashing machines and into vending machines, such for example, as coffee or soft drink machines.

There has been a strong demand in the home appliance and vending machine industries for liquid dispensing devices which are capable of accurately and quickly dispensing liquid additives. It is desirable that such dispensing devices be capable of automatically metering predetermined amounts of liquid additives and be capable of storing a sufficient quantity of additives for a large number of operations.

One factor in the appliance industry leading to the need for automatic liquid dispensing devices has been the trend in recent years towards the development and marketing of automatic clothes and dishwashing machines. The trend has included within its scope the automation of numerous tasks ancillary to the actual washing process. One such task which has recently drawn the attention of the appliance industry is that of dispensing the various liquid additives which are used in the washing process. In particular, there has been a need for a dispensing device for use with dishwashing machines. The dispensing device is needed for the injection of a rinse additive into the machine to produce spot-free drying of dishes. It is impractical for the housewife to add a rinse additive at the point in the dishwashing process where it is needed, i.e., during the rinsing process which follows the actual washing step. While the present invention is not limited to dishwashing machines, it is particularly adapted to be used with such appliances.

One desirable feature of such a liquid dispensing device is that it be operable with a minimum number of component parts. Simplicity of design results in reducing manufacturing costs. Manufacturing costs are, of course, vitally important when considering the addition of an accessory device to an appliance. Preferably, the dispenser is not of the type that will readily break down and need expensive servicing. It should be rugged and durable in use. Another important feature is that the device have accurate metering means. A small metering error is very significant in proportion to the small total amount of additive dispensed in each operation.

These features are incorporated into the liquid dispensing device of the present invention, in which the objects are:

(1) to provide a liquid dispensing device which will automatically dispense metered amounts of liquid;

(2) to provide an electrically-operated dispensing device which may be conveniently correlated with the cycle of the machine with which it is used;

(3) to provide an electrically-operated dispensing device in which the use of limit switches is avoided to prevent the creation of radio interference;

(4) to provide, in one embodiment, a structure having a storage container of sufficient capacity to dispense the required amount of liquid wetting agent, detergent, bleach, or other additive for a large number of operations;

(5) to provide a dispensing device which is rapid acting to dispense the required amount of liquid in a very short period of time;

(6) to provide a dispensing device of the universal type which can be constructed to handle many different kinds of liquid;

(7) to provide a dispensing device in which fluid flow is accomplished by means of a gravity feed;

(8) to provide a device which is self-priming to avoid the necessity for a mechanism to fill the metering chamber; and (9) to provide, in one embodiment, metering means for a dispenser as a separate unit whereby the device may be applied to any reservoir with resultant additional flexibility in various applications.

Other objects of this invention will appear in the following description and appended claims, reference being had to the accompanying drawings forming a part of this specification wherein like reference characters designate corresponding parts in the several views.

In the drawings:

Fig. 4 is a sectional view taken substantially along the line 4—4 of Fig. 3 looking in the direction of the arrows;

Fig. 5 is a sectional view taken substantially along the line 5—5 of Fig. 1 looking in the direction of the arrows;

Fig. 6 is a top plan view of a second embodiment of the present invention;

Fig. 8 is a side elevational view of the Fig. 7 embodiment sectioned along the line 8—8 of Fig. 7 looking in the direction of the arrows.

Fig. 9 is a view of a second embodiment of fill spout means sectioned in a manner similar to Fig. 5.

Figures 1, 2, 3:
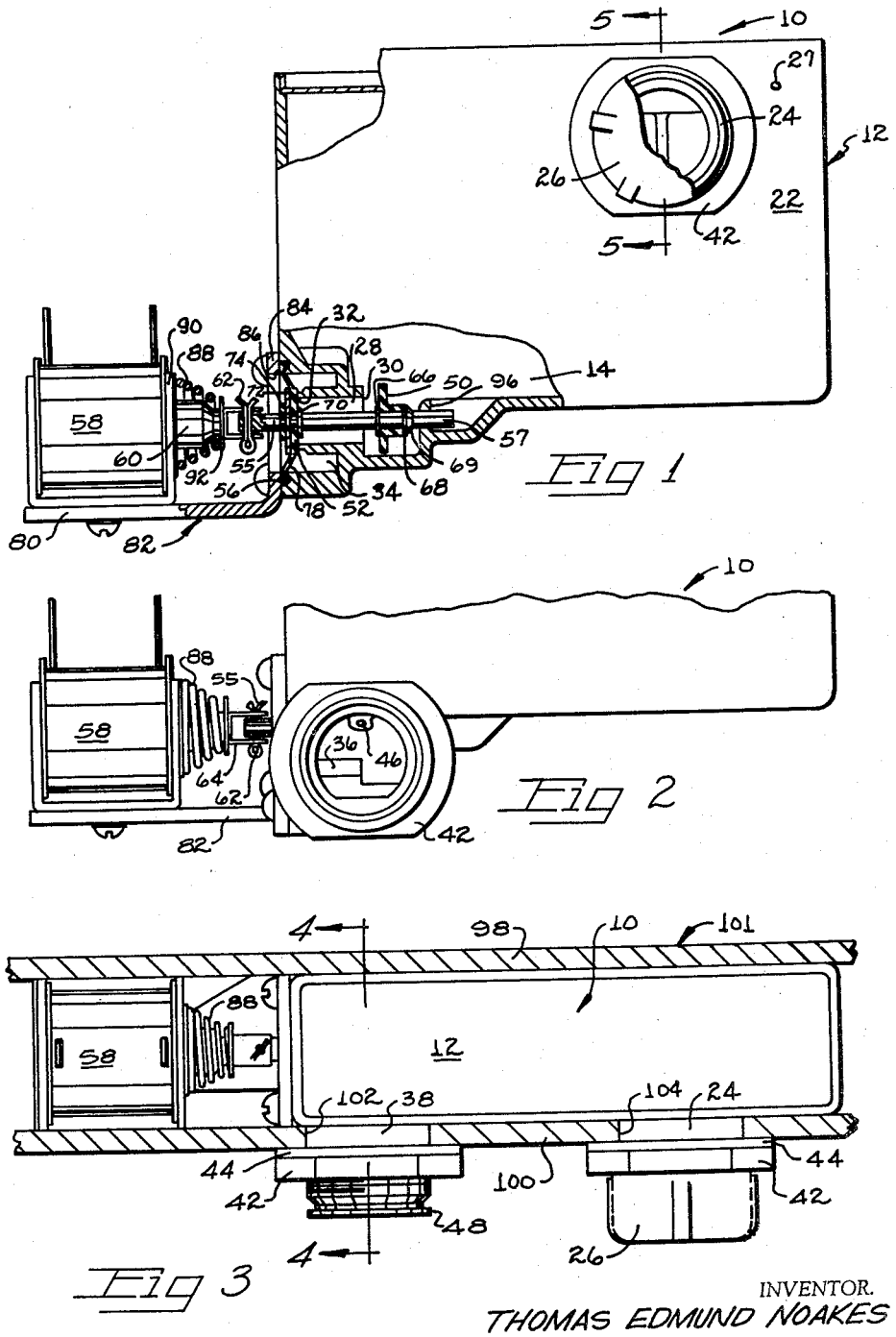
Fig. 1 is a side elevational view of one embodiment of the present invention with parts broken away for the purpose of clarity.
Fig. 2 is a side elevational view of the Fig. 1 embodiment, showing the details of the outlet spout.
Fig. 3 is a top plan view of the Fig. 1 embodiment.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Broadly, the liquid dispensing device 10 of the present invention, as shown in Figs. 1 through 5, 9 and 10, comprises liquid additive storage means and metering means to dispense a predetermined quantity of a liquid additive. The device 10 is operated by power means including a solenoid 58 and spring 88 whereby the dispensing of liquid additive may be conveniently controlled to operate at the desired point in the cycle of the associated appliance.

The liquid additive storage means of the dispenser 10 includes a container 12 having a reservoir 14 for the storage of a quantity of liquid additive. The container 12 comprises a generally oblong open topped box-like structure 16 having a recessed lid 18 which may be cemented or welded into place. The container 12 is preferably fabricated of a plastic material.

A fill opening 20 is provided in one side wall 22 of the container 12. The opening 20 is provided with an outwardly extending externally threaded conduit 24 which may be sealed by means of a threaded cap 26. A vent hole 27 is provided in the upper portion of the container 12 to provide for the escape or entrance of air as the reservoir 14 is filled or emptied.

A metering chamber 28 is provided in one lower corner of the container 12. The chamber 28 has an inlet opening 30 which communicates with the reservoir 14 and an outlet opening 32 in axial alignment therewith which communicates with an annular passageway 34 partially surrounding the chamber 28. The passageway 34, as shown in Fig. 4, communicates with a downwardly sloping discharge passageway 36 which extends from the lower portion of the passageway 34 and leads into the container outlet opening 35.

A discharge spout 38 is provided at the outlet opening 35. The spout 38 is externally threaded at 40 to receive a nut 42 and washer 44 for securement of the dispenser 10 to a supporting structure. A vent 46 is provided leading from the upper portion of the annular passageway 34 to the upper portion of the spout 38. The vent 46 permits air to enter the annular passageway 34 and metering chamber 28 during periods when liquids is being dispensed and thus prevents the formation of a vacuum which would inhibit the flow of fluid from the dispenser 10. Location of the vent 46 leading to the outlet spout 38 insures that any liquid which escapes through the vent will run into the associated appliance rather than seeping onto the exterior of the container 12 and causing a clean-up problem. A lip 48 is provided at the discharge end of the spout 38 to prevent dripping of the liquid at the termination of dispensing. Small amounts of liquid remaining in the spout 38 at the end of the dispensing operation will tend to collect around the edges of the lip, rather than to continue dripping into the associated appliance.

Figure 10:
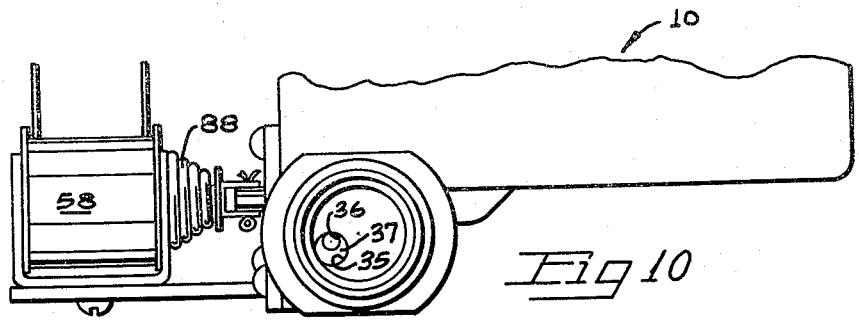
Fig. 10 is a partial side elevational view of the Fig. 1 embodiment, showing details of a second embodiment of the outlet spout.

As shown in Fig. 10, the discharge passageway 36 may be provided having a conical configuration with side walls 37 flaring outwardly towards the container outlet opening 35. This arrangement permits the dispenser 10 to be mounted at a plurality of angles in the vertical plane while still maintaining the discharge passageway 36 in a downwardly sloping position and thus maintain gravity flow of liquid from the dispenser.

Solenoid operated valve means are provided to open and close the metering chamber 28. Resilient valve elements or discs 50, 52 are positioned adjacent the inlet and outlet openings 30, 32 of the chamber 28. The disc 50 is positioned on the upstream side of the inlet opening 30 and the disc 52 is positioned on the downstream side of the outlet opening 32. The discs 50, 52 are carried on a rod 54 which extends axially through the chamber 28. The valve elements 50, 52 are spaced apart a distance greater than the length of the metering chamber 28. One end 55 of the rod 54 extends through an opening 56 formed in the container 12 in registry with the annular passageway 34. The end 55 is connected to the plunger 60 of a solenoid 58, by means of a cotter pin 62 and a bracket 64. The disc 50 is secured to the rod 54 by means of a pair of collars 66, 68. The disc 50 may be positioned between the collars 66, 68 by forcing it over the tapered shoulder 69 of the collar 68. The other disc 52 is retained on the rod 54 between a flange 70 and a removable washer 72 and ring 74 combination. The ring 74 is retained in an annular groove provided in the rod 54. A diaphragm 78 extends from the disc 52 and is sealingly engaged around the periphery of the opening 56 whereby to form a movable wall.

The solenoid 58 is secured to the horizontally extending leg 80 of a right-angle bracket 82. The vertically extending leg 84 of the bracket 82 is secured to the container 12. An opening 86 is provided in the leg 84 to register with the opening 56 in the container 12. A conical range spring 88 is retained between the casing 90 of the solenoid 58 and a disc 92 provided on the solenoid plunger 60. The inner end 57 of the rod 54 extends through an opening in an upstanding wall 96 provided within the container 12 to guide the rod 54 in its reciprocal path. The wall 96 does not extend across the width of the container 12 whereby it would form a dam and prevent liquid in the bottom of the container 12 from flowing into the metering chamber 28.

In operation of the dispensing device 10, the inlet and outlet openings 30, 32 of the metering chamber 28 are alternately blocked as one of the discs 50, 52 is moved to seat thereagainst as a result of axial movement of the rod 54. As shown in Fig. 1, the outlet opening 32 is blocked and the inlet opening 30 is opened. In this position, fluid will flow from the reservoir 14 to fill the chamber 28. The annulus between the disc 50 and the inlet 30 is large enough to allow air trapped in the chamber 28 to bubble out. When the solenoid 58 is energized, the rod 54 is moved to the left, opening the outlet 32 and closing the inlet 30. Liquid will now flow through the outlet 32 into the discharge annulus 34 and on out through the spout 38 into, for example, the tub of a dishwashing machine. The action of the solenoid 58 is immediate and prevents liquid from flowing from the reservoir 14 into the chamber 28 as the rod 54 is shifted. Upon de-energization of the solenoid 58, the spring 88 urges the rod 54 to the right, closing the outlet opening 32 and opening the inlet opening 30. The chamber 28 will again fill with liquid to ready the dispenser for the next operation.

While the dispensing device 10 of the present invention may be used in a variety of applications, it is particularly adapted for use in connection with a dishwashing machine. As shown in Fig. 3, the container 12 and solenoid 58 form a relatively narrow configuration adapted to be mounted in the narrow chamber between the outer panel 98, and inner panel 100 of a conventional two-panel door structure 101. Openings 102, 104 are provided on the inner door panel 100 for the extension of the discharge spout 38 and fill opening connector 24. The dispenser 10 is secured to the panel 100 by means of the nut 42 and washer 44 assemblies.

The dispenser 10 may be mounted to remain substantially vertical during its use. Such an application would be in the sliding door of a drawer-type dishwashing machine. In such a position it would be very difficult to fill the reservoir 14 through the fill opening 20 without the use of some auxiliary device such as a funnel. As shown in Fig. 5, a telescoping fill spout 106 may be provided in the fill opening 20 to facilitate filling the reservoir 14 when it is vertically oriented. The spout 106 comprises a tubular member 105 having an inlet opening 108 and an outlet opening 110 which communicates with the reservoir 14. A resilient O-ring 112 is provided in an annular groove to seal the assembly. Securement of the spout 106 within the connector 24 is provided by means of annular projection 116 tapering upwardly away from the opening 20 to engage an annular groove 118 provided within the connector 24. A shoulder 120 is provided in the connector 24 to prevent inward movement of the spout 106. The tubular member 105 is formed in two sections 107, 109. The outermost section 107 is slidable within the innermost section 109 whereby the spout may be telescoped together when not in use. A finger-grip tab 111 is provided at the outer end of the section 107 to facilitate the telescopic movement. A second non-telescoping spout 106 is illustrated in Fig. 9. This embodiment is in all respects similar to the Fig. 5 embodiment excepting that the tubular member 105 is provided as a unitary element. A non-telescoping spout may be used in instances where space-saving considerations are not paramount. When the dispenser 10 is mounted in a door which is adapted to be tilted to a horizontal position for entrance to the machine, the use of a fill spout 106 is not necessary as the reservoir 14 may be conveniently filled when the door is tilted to a horizontal position.

A second embodiment of the present invention is illustrated in Fig. 6. As there shown, metering means 122 similar to the Fig. 1 embodiment are provided as a separate unit from a liquid reservoir. The device 122 is adapted to be connected to a fluid reservoir for gravity feed therefrom. The reservoir may thus have a size and location in accordance with the space available in a particular appliance. The metering device 122 comprises a body 124 having an inlet 126 and an outlet 128. Conduits 130, 132 provide liquid communication with the openings 126, 128 and to carry liquid into and out of the device 122. The body 124 comprises a male section 134 and a female section 136 joined together by means of screws 138. An O-ring 140 is provided to form a liquid tight engagement of the sections 134, 136. A passageway 142 leads from the inlet opening 126 to the inlet opening 127 of a metering chamber 144 provided in the section 134. The metering chamber 144 has an outlet opening 129 communicating with an annular passageway 146 which in turn communicates with an outlet passageway 148 leading to the outlet opening 128.

Solenoid operated valve means are provided to open and close the metering chamber 144. A resilient valve element 188 is positioned on the upstream side of the inlet opening 127 and is adapted to seat thereagainst to block the flow of fluid into the chamber 144. The central portion of a diaphragm 156, positioned on the downstream side of the outlet opening 129 is utilized as a valve element to seat against the opening 129 and block the flow of fluid from the chamber 144.

The valve element 188 and diaphragm 156 are carried on a rod 150 which extends from without the body 124 through an opening 158 and thence through the metering chamber 144 to terminate in a threaded portion 152. The outer end of the rod 150 is secured to the plunger 160 of a solenoid 162. The plunger 160 is provided with a spring 166 which bears against a collar 168 and the casing 170 of the solenoid 162 to constantly urge the plunger 160 towards the right. The solenoid 162 is mounted on the horizontal leg 172 of a generally right angle bracket 174. The vertical leg 176 of the bracket 174 is secured to the male body section 134 by means of bolts 178. The leg 176 is provided with an opening 180 which registers with the opening 158.

The bracket 174 presses against the diaphragm 156 and holds it in sealing engagement around the periphery of the opening 158. The central portion of the diaphragm 156 is positioned between a resilient washer 179 and a cup-shaped member 154. This arrangement provides sufficient rigidity for the seating of the diaphragm 156 against the opening 129.

The annular valve element 188 is retained between a pair of spaced flanges of a collar 182. The collar 182 threadingly engages the threaded inner end 152 of the rod 150 to hold the valve assembly in place.

In operation, the metering device 122 operates similarly to the Fig. 1 embodiment. As shown in Fig. 6, the solenoid 162 is de-energized and the spring 166 has positioned the plunger 160 and rod 150 to the right. The diaphragm 156 blocks the outlet opening 129 and liquid is free to flow by the valve element 188 which is spaced from the tapered inlet opening 127. Consequently, the metering chamber 144 will be filled. Energization of the solenoid 162 will cause the rod 150 to move to the left, closing the inlet opening 127 and opening the outlet 129. The fluid in the chamber 144 will pass into the annular passageway 146, through the outlet 128 and thence through the conduit 132 into the associated appliance.

Figure 7:
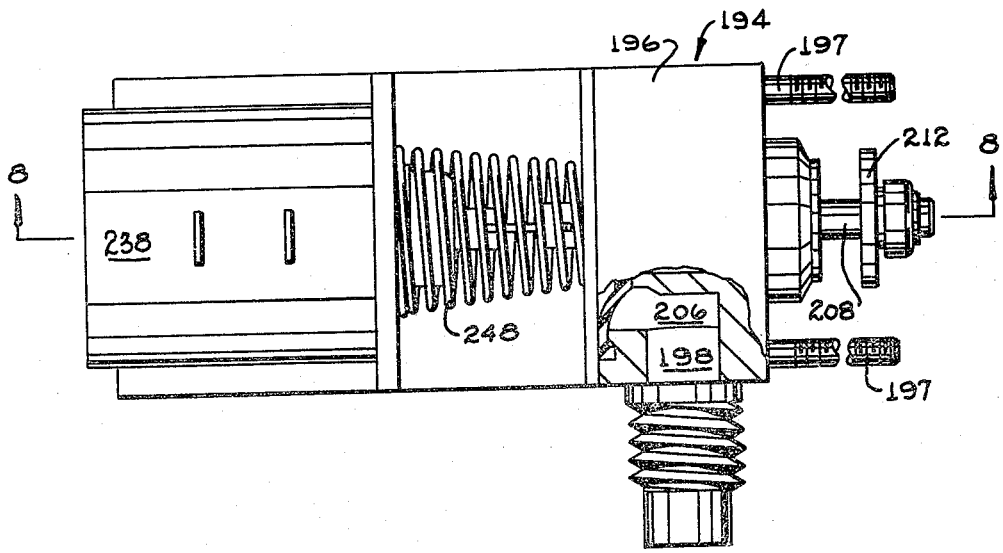
Fig. 7 is a top plan view of another embodiment of the present invention.

The third embodiment of the present invention is illustrated in Figs. 7 and 8. Similarly to the Fig. 6 embodiment, the Fig. 8 embodiment consists of metering means 194 adapted to be for gravity feed from an external fluid reservoir. The dispenser metering means 194 comprises a body 196 having an inlet opening 198 and an outlet opening 200. Studs 197 are provided on the body 196 for securement of the metering means 194 to an appliance. The inlet 198 is provided with a threaded connector 202 for securement to a fluid reservoir. The inlet 198 leads into an annular passageway 206 which surrounds a central metering chamber 204. An air vent 205 extends through the body 196 to the upper portion of the annular passageway 206. A rod 208 extends axially through the chamber 204 and carries a pair of resilient discs 210, 212. The disc 212 is secured to the outer end of the rod 208 by means of a cup washer 214 and an E-ring 216. The disc 210 is secured on the rod 208 by means of a collar 218 and a plate 220. The rod 208 is guided in the chamber 204 by means of the pilot spring 222 which is secured in an internal annular groove in the chamber 204. The spring 222 has a central coil 226 to receive the rod 208 and guide it in an axial path. The disc 210 is secured to a diaphragm 228 which sealingly closes the opening 230 in the body 196 to form movable wall means. The diaphragm 228 is held in place by means of a vertically extending leg 232 of a bracket 234. The horizontally extending leg 236 of the bracket 234 carries a solenoid 238. The plunger 240 of the solenoid 238 is secured to the outer end 242 of the rod 208 by means of an armature swivel 244 which is pivotally mounted on a bracket 246 on the end 242. A range spring 248 is provided retained between the armature casing 250 and the plate 220. The plate 220 is provided with a circumferential flange 252 to secure the spring 248 against lateral movement.

As shown in Fig. 8, the metering device 194 is indicated with the solenoid 238 de-energized and the rod 208 shifted to the right by means of the spring 248. The outlet 200 from the chamber 204 is open whereby liquid contained therein will be dispensed into the associated appliance. The diaphragm 228 is deformed inwardly and the disc 210 seats in the inlet opening 254 of the chamber 204. Energization of the solenoid 238 will shift the rod 208 to the left, causing the disc 212 to seat in the outlet 200 and the disc 210 to move away from its blocking position to the inlet 254. Liquid will then flow from the reservoir through the inlet opening 198 to fill the metering chamber 204 for the next dispensing operation.

Having thus described my invention, I claim:

1. A liquid dispensing device comprising a container having a liquid reservoir; a metering chamber positioned below the reservoir; said metering chamber having an inlet opening and an outlet opening; said inlet opening being in fluid communication with the reservoir; an annular passageway in fluid communication with said outlet opening; a discharge passageway leading from the annular passageway to a first opening in the container; a second opening in the container registering with the annular passageway; a rod extending from without the container through said second opening and through the metering chamber; a first valve disc carried on the rod on the upstream side of said metering chamber inlet opening adapted to seat against said inlet opening; a second valve disc carried on the rod on the downstream side of said metering chamber outlet opening adapted to seat against said outlet opening; a diaphragm extending from said second valve disc to sealingly engage the periphery of said second container opening; solenoid means energizable to cause reciprocation of the rod in one direction to close the first valve disc and open the second valve disc to discharge liquid contained in the metering chamber into the annular passageway; and resilient means constantly urging the rod to a position whereby the first valve disc is open and the second valve disc is closed to admit a predetermined quantity of liquid into the metering chamber.

2. A device as claimed in claim 1 and further characterized in that an air vent is provided extending from the upper portion of said annular passageway to the upper portion of said discharge passageway whereby to provide for the ingress of air into the annular passageway during periods when liquid is being discharged therefrom.

3. A device as claimed in claim 1 and further characterized in that said discharge passageway has a conical configuration with side walls flaring outwardly towards the container outlet opening whereby the dispensing device may be mounted at a plurality of angles while still maintaining the discharge passageway in a downwardly sloping position.

4. A liquid dispensing device comprising a container having a liquid reservoir; a fill opening in one side wall of said reservoir; an externally threaded conduit extending outwardly from said fill opening; a metering chamber positioned below the reservoir; said metering chamber having an inlet opening and an outlet opening; said inlet opening communicating with the reservoir; an annular passageway communicating with said outlet opening; a discharge passageway leading from the annular passageway to an outlet opening in the same container wall provided with a fill opening; an externally threaded conduit extending outwardly from said outlet opening; said two threaded conduits adapted to be inserted through openings provided in a panel member and each threadingly engaged by a fastening member to secure the dispensing device in place; a rod extending through the metering chamber; a first valve disc carried on the rod on the upstream side of said metering chamber inlet opening adapted to seat against said inlet opening; a second valve disc carried on the rod on the downstream side of said metering chamber outlet opening adapted to seat against said outlet opening; solenoid means to cause reciprocation of the rod in one direction; and resilient means constantly urging the rod in the opposite direction whereby one of the metering chamber inlet opening and metering chamber outlet opening is selectively open while the other of said openings is closed.

5. A device as claimed in claim 4 and further characterized in the provision of fill spout means for said fill opening; said fill spout means comprising an internal annular groove in the threaded fill conduit; a stop member within said conduit adjacent the container fill opening; a tubular fill spout inserted in said conduit to abut against said stop member; said spout having an outwardly projecting portion to lockingly engage said internal annular groove; the outer end of the spout being closed and the inner end of the spout being open; and a fill opening in the upper portion of the tubular member adjacent the outer end thereof.

6. A device as claimed in claim 4 and further characterized in the provision of fill spout means for said fill opening; said fill spout means comprising a tubular fill spout extending outwardly from said fill opening; the outer end of the fill spout being closed and the inner end of the spout being open; a fill opening in the upper portion of the tubular member adjacent the outer end thereof; said tubular member being formed of an outermost section and innermost section; the outermost section being slidable within the innermost section whereby the spout may be telescoped together when not in use.

7. The combination comprising a dishwashing machine having a door including a pair of spaced inner and outer door panels to form a relatively narrow chamber therebetween; a liquid dispensing device secured between said panels; said dispensing device comprising a relatively narrow container having a liquid reservoir; a fill opening in a side wall of the container adjacent the inner panel of the door; an externally threaded conduit extending outwardly from said fill opening through a first opening formed in said inner door panel; a metering chamber in said container positioned below the reservoir; said metering chamber having an inlet opening and an outlet opening; said inlet opening communicating with the reservoir; an annular passageway communicating with said outlet opening; a discharge passageway leading from the annular passageway to an outlet opening in a side wall of the container adjacent the inner panel of the door; an externally threaded conduit extending outwardly from said outlet opening through a second opening formed in the inner door panel; and fastening members threadingly engaging said fill opening conduit and outlet opening conduit to thereby secure the dispensing device in place; and solenoid operated valve means to selectively open one of the metering chamber inlet opening and the metering chamber outlet opening and to simultaneously close the other of said openings.

8. A liquid metering device comprising a body having a metering chamber adapted to be positioned below liquid storage means; said metering chamber having an inlet opening and an outlet opening; said inlet opening adapted to provide fluid communication with said reservoir; an annular passageway communicating with said outlet opening; a discharge passageway leading from the annular passageway to a first opening in the body; a second opening in the body registering with the annular passageway; a rod extending from without the body through said second opening and through the metering chamber; a first valve element carried on the rod on the upstream side of said metering chamber inlet opening adapted to seat against said inlet opening; a second valve element carried on the rod on the downstream side of said metering chamber outlet opening adapted to seat against said outlet opening; a diaphragm extending from said second valve element to sealingly engage the periphery of said second body opening; solenoid means energizable to cause reciprocation of the rod in one direction to close the first valve element and open the second valve element to discharge liquid contained in the metering chamber into the annular passageway; and resilient means constantly urging the rod to a position whereby the first valve element is open and the second valve element is closed to admit a predetermined quantity of liquid into the metering chamber.

9. A liquid metering device comprising a body having a metering chamber adapted to be positioned below liquid storage means; a first opening in said body providing an outlet opening for said metering chamber; said metering chamber having an inlet opening to provide fluid communication with an annular passageway in the body; an inlet passageway leading from a second opening in said body to said annular passageway; said second body opening adapted to provide liquid communication with said liquid storage means; a third opening in the body registering with the annular passageway; a rod extending from without the body through said third opening and through the metering chamber to terminate outside said first body opening; a first valve element carried on the rod on the upstream side of said metering chamber inlet opening adapted to seat against said inlet opening; a second valve element carried on the rod on the downstream side of said first body opening adapted to seat against said first opening; a diaphragm extending from said first valve element to sealingly engage the periphery of said third body opening; solenoid means energizable to cause reciprocation of the rod in one direction to close the second valve element and open the first valve element to admit a predetermined quantity of liquid into the metering chamber; and resilient means constantly urging the rod to a position whereby the first valve element is closed and the second valve element is open to discharge liquid contained in the metering chamber through the first body opening.

10. A liquid dispensing device comprising a container having a liquid reservoir; a metering chamber positioned to be gravity fed from the reservoir; said metering chamber having an inlet opening and an outlet opening; said inlet opening communicating with the reservoir; a discharge passageway leading from the outlet opening of the metering chamber; a rod extending through an opening in the container and through the metering chamber; a first valve disc carried on the rod on the upstream end of said metering chamber adapted to seat against said inlet opening; a second valve disc carried on the rod on the downstream end of said metering chamber adapted to seat against said outlet opening; a diaphragm joined to said second valve disc and extending radially therefrom to sealingly engage said container opening; solenoid means to cause reciprocation of the rod in one direction; and resilient means constantly urging the rod in the opposite direction whereby one of the metering chamber inlet opening and metering chamber outlet opening is selectively open while the other of said openings is closed.

11. A liquid dispensing device comprising a body member having a chamber therein open at one end and having a first valve seat externally surrounding said end opening, said chamber having its other end open, said body member having a second valve seat externally surrounding the other open end of said chamber, a rod extending through the chamber and projecting from the opposite ends thereof, a first valve member secured on said rod external of said chamber and engageable with said first seat, a second valve member secured on said rod external of said chamber and engageable with said second valve seat, the distance between said valve members being greater than the length of said chamber and the distance between said seats whereby said valve members upon reciprocation of said rod are alternately engageable with their respective seats, a spring acting on said rod and operable to move said rod to seat one of said valve members, a solenoid having a reciprocal core member aligned with and operatively connected to said rod to move said rod to seat the other of said valve members, said body member having a portion spaced from and surrounding said second valve seat, a flexible diaphragm sealed to and surrounding said rod at said second valve member and having its outer periphery sealed to said surrounding portion, and means forming an outlet from the space between said diaphragm and said second valve seat.

12. A device for dispensing liquid from a body of said liquid, said device comprising means defining a dispensing passage for the gravity reception of liquid from the body and having spaced inlet and outlet openings circumscribed by oppositely directly axially spaced valve seats, a valve rod extending axially of said passage, valve members spaced on said rod through a distance greater than the distance between said valve seats, power means for reciprocating the valve rod to alternately engage said valve members with said seats, one of said valve members being a resiliently distortable diaphragm having its center portion secured to said rod for movement therewith and its circumferential portion effecting a sealing joint isolating the power means from the passage, that portion of the diaphragm intermediate the circumferential portion thereof and the center portion thereof being engageable with one of said valve seats.

13. In a device for dispensing liquid from a body of said liquid, said device including means defining a dispensing passage for the gravity reception of liquid from the body and having spaced inlet and outlet openings, means adjacent said openings defining, respectively, inlet and outlet valve seats, and a valve rod extending axially of said passage, the improvements of valve members carried by said rod, said valve members being spaced through a distance greater than the distance between said valve seats, combined solenoid and spring means located externally of said body of liquid for reciprocating the valve rod to alternately engage said valve members with said seats, said spring being effective when the solenoid is not energized to engage one of the valve members with the outlet valve seat and to accommodate the gravity flow of liquid into said passage through the inlet opening, said one of said valve members being a resiliently distortable diaphragm having its center portion sealed to said rod for movement therewith and having its circumferential portion fixed to the device in surrounding relation to said outlet opening to sealingly isolate the solenoid and spring means from the body of liquid and from the passage, that portion of the diaphragm intermediate the circumferential portion thereof and the center portion thereof defining the valve member for engagement with the outlet valve seat.

References Cited in the file of this patent

UNITED STATES PATENTS

| | | |
|---|---|---|
| 2,039,624 | Bigelow | May 5, 1936 |
| 2,313,846 | Tamminga | Mar. 16, 1943 |
| 2,578,994 | Dunaway | Dec. 18, 1951 |
| 2,612,300 | Mathews | Sept. 30, 1952 |
| 2,659,518 | Donnelly | Nov. 17, 1953 |
| 2,792,920 | Sutphen et al. | May 21, 1957 |
| 2,807,393 | Metrailer et al. | Sept. 24, 1957 |
| 2,887,255 | Bauerlein | May 19, 1959 |